United States Patent
Jung et al.

(10) Patent No.: US 11,784,004 B2
(45) Date of Patent: Oct. 10, 2023

(54) CERAMIC ELECTRONIC COMPONENT AND METHOD OF MANUFACTURING THE SAME

(71) Applicant: SAMSUNG ELECTRO-MECHANICS CO., LTD., Suwon-si (KR)

(72) Inventors: Dong Jun Jung, Suwon-si (KR); Dae Hee Lee, Suwon-si (KR); Hyun Kim, Suwon-si (KR); Yun Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 224 days.

(21) Appl. No.: 17/406,456

(22) Filed: Aug. 19, 2021

(65) Prior Publication Data

US 2022/0130615 A1   Apr. 28, 2022

(30) Foreign Application Priority Data

Oct. 22, 2020 (KR) .......................... 10-2020-0137682
Apr. 27, 2021 (KR) .......................... 10-2021-0054242

(51) Int. Cl.
*H01G 4/30* (2006.01)
*H01G 4/012* (2006.01)
(Continued)

(52) U.S. Cl.
CPC ............. *H01G 4/30* (2013.01); *C04B 35/468* (2013.01); *H01G 4/008* (2013.01); *H01G 4/012* (2013.01);
(Continued)

(58) Field of Classification Search
CPC .......... C04B 35/468; C04B 2235/6583; C04B 2235/66; H01G 4/008; H01G 4/012; H01G 4/1227; H01G 4/30
See application file for complete search history.

(56) References Cited

U.S. PATENT DOCUMENTS

2008/0112109 A1    5/2008  Muto et al.
2010/0067171 A1*   3/2010  Yamazaki ........... C04B 35/4682
                                                    361/321.4
(Continued)

FOREIGN PATENT DOCUMENTS

JP    2012-129508 A    7/2012
JP    2012-193072 A   10/2012
(Continued)

OTHER PUBLICATIONS

Yet-Ming Chiang et al., Grain-Boundary Chemistry of Barium Titanate and Strontium Titanate: II, Origin of Electrical Barriers in Positive-Temperature-Coefficient Thermistors, J. Am. Ceram. Soc., vol. 73 [11], pp. 3286-3291 (1990).

*Primary Examiner* — Nathan Milakovich
(74) *Attorney, Agent, or Firm* — MORGAN, LEWIS & BOCKIUS LLP

(57) ABSTRACT

A ceramic electronic component includes a body including a dielectric layer and an internal electrode; and an external electrode disposed on the body and connected to the internal electrode. The dielectric layer includes a plurality of crystal grains and a grain boundary disposed between adjacent crystal grains. A ratio ($C_2/C_1$) of an Mg content ($C_2$) of the grain boundary to an Mg content ($C_1$) of at least one of the plurality of crystal grains is 3 or more.

27 Claims, 8 Drawing Sheets

(51) Int. Cl.
*H01G 4/12* (2006.01)
*C04B 35/468* (2006.01)
*H01G 4/008* (2006.01)

(52) U.S. Cl.
CPC ... *H01G 4/1227* (2013.01); *C04B 2235/6583* (2013.01); *C04B 2235/66* (2013.01)

(56) References Cited

U.S. PATENT DOCUMENTS

| | | | |
|---|---|---|---|
| 2010/0188797 A1* | 7/2010 | Yamazaki | H01G 4/1227 361/313 |
| 2010/0195260 A1* | 8/2010 | Ishihara | H01G 4/30 361/313 |
| 2012/0162858 A1 | 6/2012 | Tanaka et al. | |
| 2012/0238438 A1 | 9/2012 | Endo et al. | |
| 2014/0049876 A1 | 2/2014 | Yao | |
| 2016/0217924 A1* | 7/2016 | Morita | C04B 35/4682 |
| 2017/0186548 A1 | 6/2017 | Sato et al. | |
| 2019/0189345 A1* | 6/2019 | Moon | H01G 4/385 |

FOREIGN PATENT DOCUMENTS

| | | |
|---|---|---|
| JP | 2017-120854 A | 7/2017 |
| KR | 10-2008-0017344 A | 2/2008 |
| KR | 10-1486983 B1 | 1/2015 |

\* cited by examiner

CERAMIC ELECTRONIC COMPONENT AND METHOD OF MANUFACTURING THE SAME

CROSS-REFERENCE TO RELATED APPLICATION(S)

This application claims benefit of priority to Korean Patent Application No. 10-2020-0137682 filed on Oct. 22, 2020 and Korean Patent Application No. 10-2021-0054242 filed on Apr. 27, 2021 in the Korean Intellectual Property Office, the disclosures of which are incorporated herein by reference in their entirety.

TECHNICAL FIELD

The present disclosure relates to a ceramic electronic component and a method of manufacturing the same.

BACKGROUND

A multilayer ceramic capacitor (MLCC), a type of multilayer electronic component, may be a chip type capacitor mounted on the printed circuit boards of various electronic products such as imaging devices including liquid crystal displays (LCDs), plasma display panels (PDPs), and the like, and computers, smartphones, mobile phones, and the like, serving to charge or discharge electricity therein or therefrom.

Such multilayer ceramic capacitors may be used as components of various electronic devices due to their relatively small size, relatively high capacitance, and relative ease of mounting. As various electronic devices such as computers, mobile devices, or the like are miniaturized and increased in terms of output, demand for miniaturization and high capacitance of multilayer ceramic capacitors is increasing.

In order to achieve miniaturization and high capacitance of multilayer ceramic capacitors, it is necessary to increase the number of layers thereof by reducing a thickness of a dielectric layer and a thickness of an internal electrode. Currently, the thickness of the dielectric layer has reached about 0.6 μm, and such thinning is ongoing. However, as the thickness of the dielectric layer decreases, an electric field applied to the dielectric layer at the same operating voltage may increase. Accordingly, it is essential to secure reliability of the dielectric layer.

SUMMARY

An aspect of the present disclosure is to provide a ceramic electronic component having excellent reliability.

An aspect of the present disclosure is to provide a ceramic electronic component having improved insulation resistance.

An aspect of the present disclosure is to provide a ceramic electronic component having excellent high temperature reliability.

However, the objects of the present disclosure are not limited to the above description, and will be more easily understood in the process of describing specific embodiments of the present disclosure.

According to an aspect of the present disclosure, a ceramic electronic component includes a body including a dielectric layer and an internal electrode; and an external electrode disposed on the body and connected to the internal electrode, wherein the dielectric layer includes a plurality of crystal grains and a grain boundary disposed between adjacent crystal grains, wherein a ratio (C2/C1) of an Mg content (C2) of the grain boundary to an Mg content (C1) of at least one of the plurality of crystal grains is 3 or more.

According to an aspect of the present disclosure, a method for manufacturing a ceramic electronic component includes forming a ceramic green sheet with a dielectric composition including Mg; applying a conductive paste for an internal electrode on the ceramic green sheet to form an internal electrode pattern; stacking a plurality of ceramic green sheets on which the internal electrode pattern is formed to obtain a stack body; sintering the stack body in a reducing atmosphere and re-oxidizing the sintered stack body in an oxidizing atmosphere, to prepare a body including a dielectric layer and an internal electrode; and forming an external electrode on the body. Electromotive force of the reducing atmosphere during the sintering is 50 mV or more higher than electromotive force of an Ni/NiO equilibrium partial pressure, and is 90 mV or less higher than the electromotive force of the Ni/NiO equilibrium partial pressure.

According to an aspect of the present disclosure, a ceramic electronic component includes a body including a dielectric layer and an internal electrode; and an external electrode disposed on the body and connected to the internal electrode. The dielectric layer includes a plurality of crystal grains and a grain boundary disposed between adjacent crystal grains. A Mg content (C2) of the grain boundary is 0.2 at % or more and 0.6 at % or less with respect to all contents of the grain boundary.

According to an aspect of the present disclosure, a ceramic electronic component includes a body including a dielectric layer and an internal electrode; and an external electrode disposed on the body and connected to the internal electrode. The dielectric layer includes a plurality of crystal grains and a grain boundary disposed between adjacent crystal grains. In a cross-section of the body, the dielectric layer and the internal electrode are free of an Ni—Mg—O-based secondary phase.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
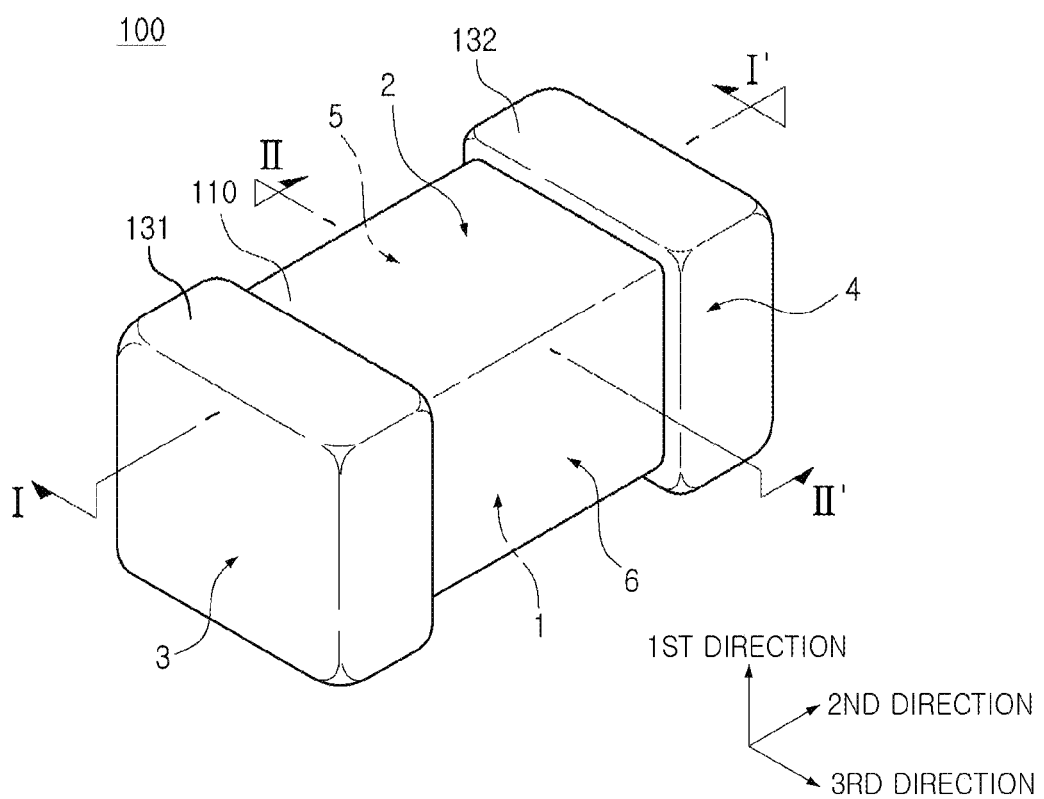
FIG. 1 is a perspective view schematically illustrating a ceramic electronic component according to an embodiment of the present disclosure.

Hereinafter, embodiments of the present disclosure will be described with reference to specific embodiments and the accompanying drawings. However, embodiments of the present disclosure may be modified into various other forms, and the scope of the present disclosure is not limited to the embodiments described below. Further, embodiments of the present disclosure may be provided for a more complete description of the present disclosure to the ordinary artisan. Therefore, shapes and sizes of the elements in the drawings may be exaggerated for clarity of description, and the elements denoted by the same reference numerals in the drawings may be the same elements.

In addition, in the drawings, portions not related to the description will be omitted for clarification of the present disclosure, and a thickness may be enlarged to clearly show layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawings, a first direction may be defined as a stacking direction or a thickness (T) direction, a second direction may be defined as a length (L) direction, and a third direction may be defined as a width (W) direction.

Ceramic Electronic Component

FIG. 1 is a perspective view schematically illustrating a ceramic electronic component according to an embodiment of the present disclosure.

Figure 2:
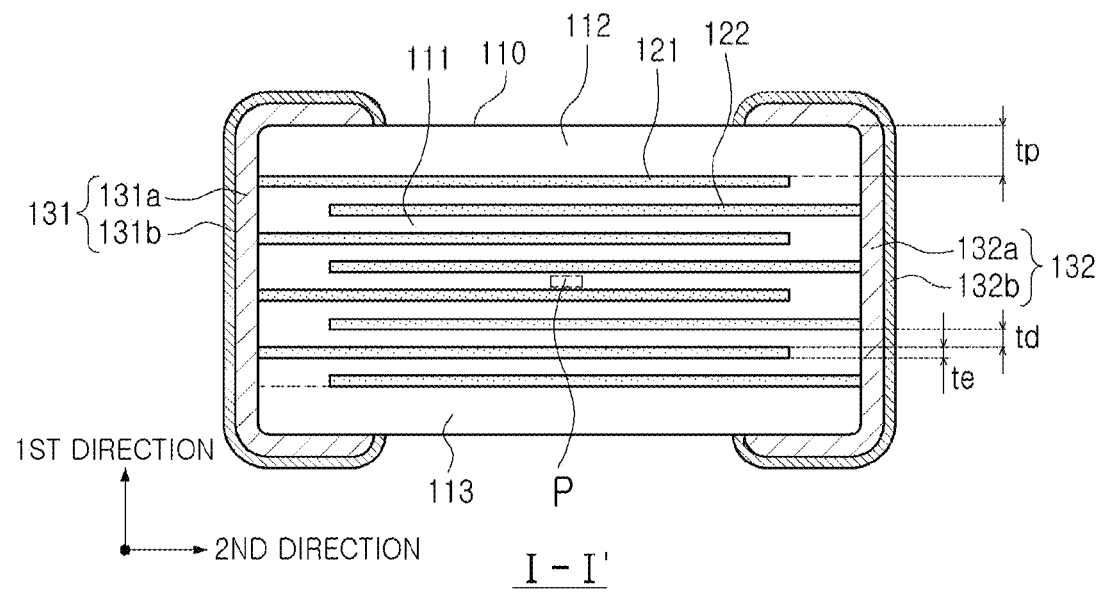
FIG. 2 is a cross-sectional view taken along line I-I' of FIG. 1.

FIG. 2 is a cross-sectional view taken along line I-I' of FIG. 1.

Figure 3:
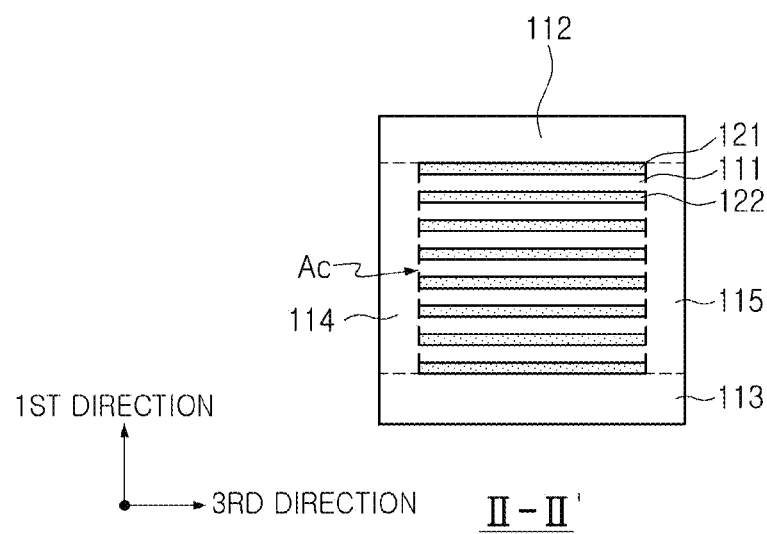
FIG. 3 is a cross-sectional view taken along line II-II' of FIG. 1.

FIG. 3 is a cross-sectional view taken along line II-II' of FIG. 1.

Figure 4:
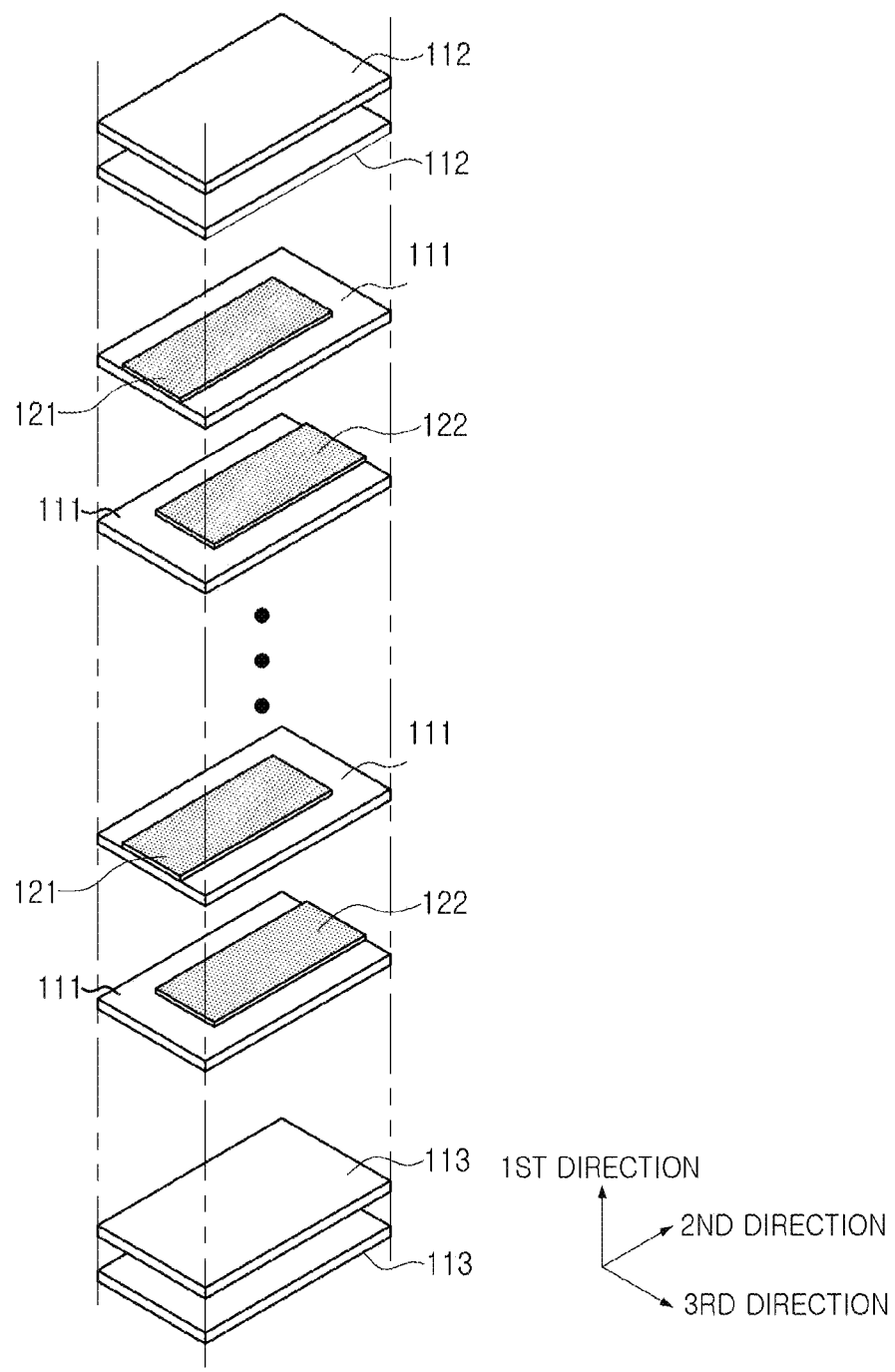
FIG. 4 is an exploded perspective view schematically illustrating a body of a ceramic electronic component according to an embodiment of the present disclosure.

FIG. 4 is an exploded perspective view schematically illustrating a body of a ceramic electronic component according to an embodiment of the present disclosure.

Figure 5:
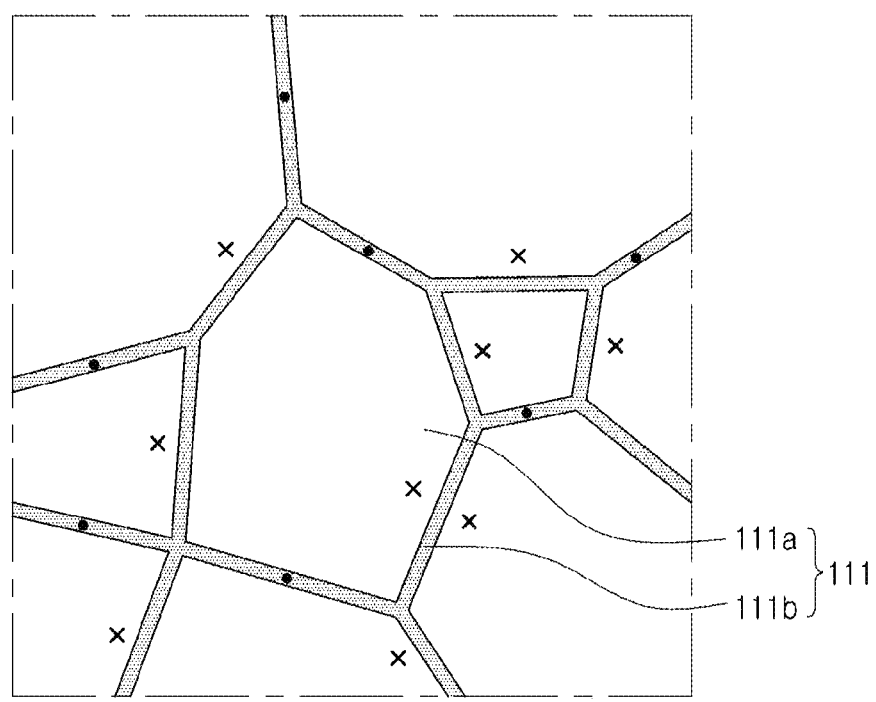
FIG. 5 is an enlarged view of portion "P" of FIG. 2.

FIG. 5 is an enlarged view of portion "P" of FIG. 2.

Hereinafter, a ceramic electronic component 100 according to an embodiment of the present disclosure will be described in detail with reference to FIGS. 1 to 5. Also, a multilayer ceramic capacitor (hereinafter referred to as 'MLCC') will be described as an example of a ceramic electronic component, but the present disclosure is not limited thereto. In addition, a ceramic electronic component using a ceramic material such as an inductor, a piezoelectric element, a varistor, a thermistor, or the like, may be also applied.

A ceramic electronic component 100 according to an embodiment of the present disclosure may include a body 110 including a dielectric layer 111 and an internal electrode 121 or 122; and an external electrode 131 or 132 disposed on the body and connected to the internal electrode. The dielectric layer 111 may include a plurality of crystal grains 111a and a grain boundary 111b disposed between adjacent grains. A ratio (C2/C1) of an Mg content (C2) of the grain boundary 111b to an Mg content (C1) of at least one of the plurality of crystal grains 111a may be 3 or more. In one example, a ratio of a content may refer to a mole ratio or an atomic ratio.

In the body 110, the dielectric layer 111 and the internal electrode 121 or 122 may be alternately stacked.

Although the specific shape of the body 110 is not particularly limited, as illustrated, the body 110 may have a hexahedral shape or the like. Due to shrinkage of ceramic powder contained in the body 110 during a sintering process, the body 110 may not have a perfectly hexahedral shape with completely straight lines, but may have a substantially hexahedral shape overall.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 may be in a sintered state, and a boundary between adjacent dielectric layers 111 may be integrated to such an extent that it is difficult to identify the boundary without using a scanning electron microscope (SEM).

The dielectric layer 111 may include a plurality of crystal grains 111a and a grain boundary 111b disposed between adjacent grains. A ratio (C2/C1) of an Mg content (C2) of the grain boundary 111b to an Mg content (C1) of at least one of the plurality of crystal grains 111a may be 3 or more. A ratio (C2/C1) of an Mg content (C2) of the grain boundary 111b to an Mg content (C1) of each of the plurality of crystal grains 111a may be 3 or more.

A multilayer ceramic capacitor (MLCC), the ceramic electronic component, has been increasing in terms of capacitance thereof and while layers thereof are thinned. As a thickness of a dielectric layer decreases, an electric field applied to the dielectric layer at the same operating voltage may increase. Therefore, it is essential to secure reliability of the dielectric layer.

The most important indicator of reliability of the dielectric layer may be insulation resistance (IR), and studies on degradation behavior of the insulation resistance have been actively conducted to secure reliability of MLCC. A main component constituting the insulation resistance may be known as grain boundary resistance due to a Schottky type energy barrier present in a grain boundary of the dielectric layer. Since it may be a main variable for determining the insulation resistance by the grain boundary resistance, a technology of increasing the number of crystal grains by suppressing crystal grain growth has been developed, in order to improve reliability of the MLCC. However, in suppressing the crystal grain growth, it has been difficult to increase capacitance due to a simultaneous decrease in dielectric constant.

Therefore, the present disclosure may be intended to improve reliability by controlling composition of a grain boundary without excessively suppressing crystal grain growth. Grain boundary resistance may be generated by cations present in the grain boundary of a dielectric layer. Cations precipitated or not dissolved at the grain boundary may form a space charge layer, and may generate an energy barrier to increase grain boundary resistance. Therefore, grain boundary resistance may be enhanced by lowering solubility of an additive added to control properties of a $BaTiO_3$ (BT) dielectric.

Mg may be distributed at a grain boundary or in a shell of crystal grains of a dielectric layer having a core-shell structure having a core and a shell, to playa role in suppressing dissolution of other elements into the crystal grains of the dielectric layer. According to an embodiment of the present disclosure, a ratio (C2/C1) of an Mg content (C2) of the grain boundary to an Mg content (C1) of at least one of the crystal grains may be set to be 3 or more, to suppress dissolution of other elements into the crystal grains of the dielectric layer while not excessively suppressing grain growth, and to improve grain boundary resistance.

When a ratio (C2/C1) of an Mg content (C2) of the grain boundary to an Mg content (C1) of at least one of the crystal grains is less than 3, effects of improving grain boundary resistance and preventing other additives from being dissolved into the crystal grains may be insufficient.

An upper limit of a ratio (C2/C1) of an Mg content (C2) of the grain boundary to an Mg content (C1) of at least one of the crystal grains is not particularly limited. When an upper limit of a ratio (C2/C1) of an Mg content (C2) of the grain boundary to an Mg content (C1) of at least one of the crystal grains is more than 10, an effect of improving grain boundary resistance due to Mg and an effect of preventing other additives from being dissolved in the crystal grains may be saturated. Therefore, an upper limit of a ratio (C2/C1) of an Mg content (C2) of the grain boundary to an Mg content (C1) of at least one of the crystal grains may be 10.

In this case, an Mg content (C1) of at least one of the crystal grains and an Mg content (C2) of the grain boundary may be averaged by analyzing compositions of 10 random locations in each of the three dielectric layers disposed in a central portion of the body in the length and thickness directions by using STEM-EDS. Referring to FIG. 5, an Mg content (C2) of the grain boundary may be measured at a position indicated by 0, which may be a central portion of the grain boundary, and an Mg content (C1) of at least one of the crystal grains may be measured at a position indicated by X, which may be 30 nm apart from a central portion of the grain boundary in a direction, perpendicular to the grain boundary. The central portion of the grain boundary may refer to a position in which an Mg content is highest, as a result of performing a line-profile using STEM-EDS, in a direction, perpendicular to the grain boundary.

In an embodiment, the Mg content (C2) of the grain boundary may be an Mg content in the central portion of the grain boundary, and the Mg content (C1) of at least one of the crystal grains may be an Mg content at a position 30 nm apart from the central portion of the grain boundary in a direction, perpendicular to the grain boundary.

In this case, the Mg content (C2) of the grain boundary may be 0.2 at % or more and 0.6 at % or less with respect to all the contents of the grain boundary, and preferably 0.25 at % or more and 0.55 at % or less with respect to all the contents of the grain boundary.

Further, the Mg content (C1) of at least one of the crystal grains may be 0.01 at % or more and 0.15 at % or less with respect to all the contents of the at least one of the crystal grains, and preferably 0.05 at % or more and 0.1 at % or less with respect to all the contents of the at least one of the crystal grains.

A method of controlling a ratio (C2/C1) of an Mg content (C2) of the grain boundary to an Mg content (C1) of at least one of the crystal grains to 3 or more does not need to be particularly limited. In general, when Mg as a form of MgO is added to a dielectric composition, since the MgO may be more easily dissolved in NiO, compared to $BaTiO_3$, a Ni—Mg—O secondary phase may be formed and agglomerated, in an atmosphere in which an internal electrode of Ni may be oxidized, and it may be difficult to distribute Mg in a grain boundary. Therefore, an effect of suppressing dissolution of other elements into the crystal grains of the dielectric layer may be insufficient. Therefore, by performing a sintering process in a sintering atmosphere in which Ni cannot be thermodynamically oxidized, oxidation of the Ni internal electrode may be prevented, and Mg may be prevented from forming or segregating a Ni—Mg—O secondary phase, to distribute Mg evenly to the grain boundary. Therefore, a ratio (C2/C1) of an Mg content (C2) of the grain boundary to an Mg content (C1) of at least one of the crystal grains may be controlled to be 3 or more.

In an embodiment, the internal electrode 121 or 122 and the dielectric layer 111 may not include a Ni—Mg—O secondary phase. This is because when the Ni—Mg—O secondary phase is formed, it may be difficult to distribute Mg to the grain boundary, and accordingly, an effect of suppressing dissolution of other elements into the crystal grains of the dielectric layer may be insufficient.

In this case, presence or absence of the Ni—Mg—O secondary phase may be confirmed in the SEM-EDS mapping image taken at 9900× magnification of the central portion of the cross-section in the length and thickness directions, cut from the central portion in the width direction, as shown in FIGS. 6A to 7C. When a region in which Mg is segregated with a size of 10 nm or more, present in a circled portion, is observed in FIG. 7A, it may be determined if a Ni—Mg—O secondary phase is present.

In an embodiment, the grain boundary 111b may further include Dy. In this case, a Dy content does not need to be particularly limited, but the Dy content may be 0.5 at % or more and 2.0 at % or less with respect to all the contents of the grain boundary, and preferably 0.7 at % or more and 1.8 at % or less with respect to all the contents of the grain boundary. Dy may also be included in each of the crystal grains. According to the present disclosure, when Mg is included in the grain boundary more than three times as compared to each of the crystal grains, since dissolution of Dy into the crystal grains of the dielectric layer may be suppressed, a Dy content in each of the crystal grains may be 0.5 at % or less.

In an embodiment, the grain boundary 111b may further include Si. In this case, an Si content does not need to be particularly limited, but the Si content may be 1.0 at % or more and 5.0 at % or less with respect to all the contents of the grain boundary, and preferably 1.6 at % or more and 3.7 at % or less with respect to all the contents of the grain boundary. Si may also be included in each of the crystal grains. According to the present disclosure, when Mg is included in the grain boundary more than three times as compared to each of the crystal grains, since dissolution of Si into the crystal grains of the dielectric layer may be suppressed, an Si content in each of the crystal grains may be 0.5 at % or less.

In an embodiment, at least one crystal grain, among the plurality of crystal grains, may have a core-shell structure having a core and a shell. When the at least one crystal grain has the core-shell structure, an Mg content (C1) of the at least one crystal grain may refer to an Mg content in a shell corresponding thereto, and may be an Mg content measured at a position 30 nm apart from a central portion of the grain boundary in a direction, perpendicular to the grain boundary. For example, a ratio of an Mg content of the grain boundary to an Mg content of the shell may be 3 or more.

In addition, an Mg content of a core corresponding thereto may be less than or equal to 0.01 at % with respect to all the contents of the core. The Mg content of the core may be measured in a central portion of the core.

In an embodiment, the dielectric layer 111 may include $BaTiO_3$ as a main component.

A thickness td of the dielectric layer 111 does not need to be particularly limited.

In general, when the dielectric layer was formed to have a thickness of less than 0.6 μm, in particular, when a thickness of the dielectric layer was 0.5 μm or less, there was a concern that reliability may be deteriorated.

As described above, according to an embodiment of the present disclosure, a ratio (C2/C1) of an Mg content (C2) of the grain boundary to an Mg content (C1) of at least one of the crystal grains may be set to be 3 or more, distribution of Mg grain boundary may be induced and grain boundary resistance may increase to improve reliability. Therefore, excellent reliability may be ensured, even when a thickness of the dielectric layer 111 is 0.5 μm or less.

Therefore, when a thickness of the dielectric layer 111 is 0.5 μm or less, an effect of improving reliability according to the present disclosure may be more remarkable.

The thickness td of the dielectric layer 111 may refer to an average thickness of the dielectric layer 111 disposed between the first and second internal electrodes 121 and 122.

The average thickness of the dielectric layer 111 may be measured by scanning an image of a cross-section of the body 110 in the length and thickness direction (L-T) with a scanning electron microscope (SEM).

For example, with respect to a dielectric layer extracted in an image of a cross-section of the body 110 in the first and second directions (length and thickness directions), cut from the central portion in the third direction (width direction), scanned by a scanning electron microscope (SEM), thicknesses at 30 equally spaced points in the longitudinal direction may be measured to determine an average value thereof.

The thicknesses measured at 30 equally spaced points may be measured in a capacitance forming portion Ac, which refers to an area in which the first and second internal electrodes 121 and 122 overlap each other.

The body 110 may include a capacitance forming portion Ac disposed in the body 110 and including the first internal electrode 121 and the second internal electrode 122, disposed to oppose each other with a dielectric layer 111 interposed therebetween, to form capacitance, and cover portions 112 and 113 formed above and below the capacitance forming portion Ac in the first direction.

In addition, the capacitance forming portion Ac may be a portion contributing to formation of capacitance of the capacitor, and may be formed by repeatedly stacking the plurality of first and second internal electrodes 121 and 122 with the dielectric layer 111 interposed therebetween.

The cover portions 112 and 113 may include an upper cover portion 112 disposed above the capacitance forming portion Ac in the first direction, and a lower cover portion 113 disposed below the capacitance forming portion Ac in the first direction.

The upper cover portion 112 and the lower cover portion 113 may be formed by stacking a single dielectric layer or two or more dielectric layers on upper and lower surfaces of the capacitance forming portion Ac in the thickness direction, respectively, and may be basically play a role of preventing damage to an internal electrode caused by physical or chemical stress.

The upper cover portion 112 and the lower cover portion 113 may not include an internal electrode, and may include the same material as the dielectric layer 111.

For example, the upper cover portion 112 and the lower cover portion 113 may include a ceramic material, for example, a barium titanate ($BaTiO_3$)-based ceramic material.

Thicknesses of the cover portions 112 and 113 need not be particularly limited. In order to more easily achieve miniaturization and high capacitance of a ceramic electronic component, a thickness tp of the cover portion 112 or 113 may be 20 μm or less. The thickness of tp of the cover portion 112 or 113 may be defined and measured in a manner similar to the thickness td.

In addition, margin portions 114 and 115 may be disposed on side surfaces of the capacitance forming portion Ac.

The margin portions 114 and 115 may include a margin portion 114 disposed on the fifth surface 5 of the body 110, and a margin portion 115 disposed on the sixth surface 6 of the body 110. For example, the margin portions 114 and 115 may be disposed on both side surfaces of the body 110 in the width direction.

As illustrated in FIG. 3, the margin portions 114 and 115 may refer to a region between both ends of the first and second internal electrodes 121 and 122, in the cross-section of the body 110 cut in width-thickness (WT) directions, and a boundary surface of the body 110.

The margin portions 114 and 115 may basically serve to prevent damage to the internal electrode due to physical or chemical stress.

The margin portions 114 and 115 may be formed by applying a conductive paste to form internal electrodes, except for a region in which the margin portions are formed on a ceramic green sheet.

In addition, in order to suppress a step difference caused by the internal electrodes 121 and 122, after a stacking operation, the internal electrodes may be cut to be exposed from the fifth and sixth surfaces 5 and 6 of the body. Then, a single dielectric layer or two or more dielectric layers may be stacked on both side surfaces of the capacitance formation portion A in the width direction, to form the margin portions 114 and 115.

The internal electrodes 121 and 122 may be alternately stacked with the dielectric layer 111.

The internal electrodes 121 and 122 may include a first internal electrode 121 and a second internal electrode 122. The first and second internal electrodes 121 and 122 may be alternately arranged to oppose each other, with the dielectric layer 111, constituting the body 110, interposed therebetween, and may be exposed from the third and fourth surfaces 3 and 4 of the body 110, respectively.

Referring to FIG. 2, the first internal electrode 121 may be configured to be spaced apart from the fourth surface 4, and be exposed from (or be in contact with or extend from) the third surface 3, and the second internal electrode 122 may be configured to be spaced apart from the third surface 3, and be exposed from (or be in contact with or extend from) the fourth surface 4.

In this case, the first and second internal electrodes 121 and 122 may be electrically separated from each other by the dielectric layer 111 interposed therebetween.

Referring to FIG. 4, the body 110 may be formed by alternately stacking a ceramic green sheet on which the first internal electrode 121 is printed and a ceramic green sheet on which the second internal electrode 122 is printed, and then sintering the stacked ceramic green sheets.

The internal electrodes 121 and 122 may include Ni. A material for forming the internal electrodes 121 and 122 is not particularly limited, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for the internal electrodes containing one or more of nickel (Ni), copper (Cu), palladium (Pd), silver (Ag), gold (Au), platinum (Pt), tin (Sn), tungsten (W), titanium (Ti), and alloys thereof, on the ceramic green sheets. As a printing method of the conductive paste for the internal electrodes, a screen-printing method, a gravure printing method, or the like may be used, but the present disclosure is not limited thereto.

A thickness to of the internal electrode 121 or 122 does not need to be particularly limited.

In general, when the internal electrode was formed to have a thickness of less than 0.6 μm, in particular, when a thickness of the internal electrode was 0.5 μm or less, there was a concern that reliability may be deteriorated.

As described above, according to an embodiment of the present disclosure, a ratio (C2/C1) of an Mg content (C2) of the grain boundary to an Mg content (C1) of at least one of the crystal grains may be set to be 3 or more, distribution of Mg grain boundary may be induced and grain boundary resistance may increase to improve reliability. Therefore, excellent reliability may be ensured, even when a thickness of the internal electrode 121 or 122 is 0.5 μm or less.

Therefore, when a thickness of the internal electrode 121 or 122 is 0.5 μm or less, an effect of improving reliability according to the present disclosure may be more remarkable, and miniaturization and high capacitance of the ceramic electronic component may be more easily achieved.

The thickness to of the internal electrode 121 or 122 may refer to an average thickness of the internal electrode 121 or 122.

The average thickness of the internal electrode 121 or 122 may be measured by scanning an image of a cross-section of the body 110 in the length and thickness direction (L-T) with a scanning electron microscope (SEM).

For example, with respect to a first or second internal electrode 121 or 122 extracted in an image of a cross-section of the body 110 in the first and second directions (length and thickness directions), cut from the central portion in the third direction (width direction), scanned by a scanning electron microscope (SEM), thicknesses at 30 equally spaced points in the longitudinal direction may be measured to determine an average value thereof.

The thicknesses measured at 30 equally spaced points may be measured in a capacitance forming portion Ac, which refers to an area in which the first and second internal electrodes 121 and 122 overlap each other.

The external electrodes 131 and 132 may be disposed on the third and fourth surfaces 3 and 4 of the body 110.

The external electrodes 131 and 132 may include first and second electrodes 131 and 132 disposed on the third and fourth surfaces 3 and 4 of the body 110, respectively, and connected to the first and second internal electrodes 121 and 122, respectively.

Referring to FIG. 1, the external electrodes 131 and 132 may be disposed to cover both end surfaces of the margin portions 114 and 115 in the second direction.

In this embodiment, a structure in which the ceramic electronic component 100 has two external electrodes 131 and 132 may be described, but the number, shape, and the like of the external electrodes 131 and 132 may be changed, depending on shapes of the internal electrodes 121 and 122, or other purposes.

The external electrodes 131 and 132 may be formed using any material as long as they have electrical conductivity such as metal or the like, a specific material may be determined in consideration of electrical characteristics, structural stability, or the like, and may have a multilayer structure.

For example, the external electrodes 131 and 132 may include electrode layers 131a and 132a, and plated layers 131b and 132b formed on the electrode layers 131a and 132a, respectively.

As a more specific example of the electrode layers 131a and 132a, the electrode layers 131a and 132a may be sintered electrodes including a conductive metal and a glass, or resin-based electrodes including a conductive metal and a resin.

In addition, the electrode layers 131a and 132a may have a form in which the sintered electrode and the resin-based electrode are sequentially formed on the body 110. In addition, the electrode layers 131a and 132a may be formed by transferring a sheet including the conductive metal on the body 110, or may be formed by transferring the sheet including the conductive metal to the sintered electrode.

A material having excellent electrical conductivity may be used as a conductive metal included in the electrode layers 131a and 132a, and is not particularly limited. For example, the conductive metal may be one or more of nickel (Ni), copper (Cu), and alloys thereof.

The plating layers 131b and 132b may serve to improve mounting characteristics. Types of the plating layers 131b and 132b are not particularly limited, and may be a plating layer including at least one of Ni, Sn, Pd, and alloys thereof, and may be formed of a plurality of layers.

As a more specific example of the plated layers 131b and 132b, the plated layers 131b and 132b may be nickel (Ni) plated layers, or tin (Sn) plated layers, may have a form in which the nickel (Ni) plated layers and the tin (Sn) plated layers are sequentially formed on the electrode layers 131a and 132a, and may have a form in which the tin (Sn) plated layer, the nickel (Ni) plated layer, and the tin (Sn) plated layer are formed sequentially. In addition, the plated layers 131b and 132b may include a plurality of nickel (Ni) plated layers and/or a plurality of tin (Sn) plated layers.

A size of the ceramic electronic component 100 does not need to be particularly limited.

In order to achieve miniaturization and high capacitance at the same time, a thickness of a dielectric layer and a thickness of an internal electrode should decrease to increase the number of layers. Therefore, in a ceramic electronic component 100 having a size of 1005 (length×width, 1.0 mm×0.5 mm) or less, reliability and insulation resistance improvement effects according to the present disclosure may be more remarkable.

Therefore, when the ceramic electronic component 100 has a length of 1.1 mm or less and a width of 0.55 mm or less, reliability improvement effects according to the present disclosure may be more remarkable, considering manufacturing errors and a size of an external electrode. In this case, the length of the ceramic electronic component 100 refers to a distance of the ceramic electronic component 100 in the second direction, and the width of the ceramic electronic component 100 refers to a distance of the ceramic electronic component 100 in the third direction.

Method of Manufacturing Ceramic Electronic Component

Hereinafter, a method of manufacturing a ceramic electronic component according to another aspect of the present disclosure will be described in detail. However, in order to avoid overlapping descriptions, descriptions overlapping those described in the ceramic electronic component will be omitted.

According to another aspect of the present disclosure, a method of manufacturing a ceramic electronic component, may include: using a dielectric composition including Mg to obtain a ceramic green sheet; applying a conductive paste for an internal electrode on the ceramic green sheet to form an internal electrode pattern; stacking a plurality of ceramic green sheets on which the internal electrode pattern is formed to obtain a stack body; sintering the stack body in a reducing atmosphere and re-oxidizing the sintered stack body in a reducing atmosphere, to prepare a body including a dielectric layer and an internal electrode; and forming an external electrode on the body. Electromotive force of the reducing atmosphere during the sintering may be 50 mV or more higher than electromotive force of an Ni/NiO equilibrium partial pressure, and may be 90 mV or less higher than electromotive force of the Ni/NiO equilibrium partial pressure.

First, a dielectric composition including Mg may be used to obtain a ceramic green sheet.

In this case, the dielectric composition may include $BaTiO_3$ as a main component, and may include 0.2 to 3 moles of Mg, relative to 100 moles of $BaTiO_3$. When an Mg content is less than 0.2 mol, it may be difficult to control crystal grain growth of $BaTiO_3$, and it may be difficult to control a ratio (C2/C1) of an Mg content (C2) of a grain boundary to an Mg content (C1) of a crystal grain to 3 or more. When an Mg content is more than 3 mol, crystal grain growth may be excessively suppressed.

Contents of elements included as auxiliary components, other than Mg, need not be particularly limited, and may be appropriately controlled to obtain desired properties.

For example, the dielectric composition may include 0.5 to 2 moles of Dy, relative to 100 moles of $BaTiO_3$, as an auxiliary component. In addition, the dielectric composition may include 1 to 5 moles of Si, relative to 100 moles of $BaTiO_3$, as an auxiliary component. In addition to this, auxiliary components that are generally added may be added.

In this case, after adding a minor component to the main component powder, ethanol and toluene may be used as solvents and may be mixed together with a dispersant, and then a binder may be mixed to prepare a ceramic sheet. Mg may be added in a form of MgO, Si may be added in a form of $SiO_2$, and Dy may be added in a form of $Dy_2O_3$.

Next, a conductive paste for an internal electrode may be printed on the ceramic green sheet. Thereafter, the printed ceramic green sheet may be provided as a plurality of ceramic green sheets, and the plurality of ceramic green sheets may be stacked to obtain a stack body. In this case, the conductive paste for internal electrodes may include Ni.

Next, the stack body may be obtained by stacking the plurality of ceramic green sheets on which internal electrode patterns are formed. In this case, a process of cutting the stack body into chips may be additionally performed.

Next, the stack body may be sintered in a reducing atmosphere, and the sintered stack body may be re-oxidized in a reducing atmosphere which may be an oxidizing atmosphere to prepare a body including a dielectric layer and an internal electrode.

During the sintering, electromotive force of the reducing atmosphere during the sintering may be 50 mV or more higher than electromotive force of an Ni/NiO equilibrium partial pressure, and may be 90 mV or less higher than electromotive force of the Ni/NiO equilibrium partial pressure.

In general, in order to maximally suppress reduction of $BaTiO_3$ while preventing oxidation of an Ni internal electrode in MLCC, a sintering atmosphere may be maintained at an oxygen partial pressure, similar to an Ni/NiO equilibrium partial pressure. When maintaining the oxygen partial pressure similar to the Ni/NiO equilibrium partial pressure, it may be difficult to completely prevent oxidation of the Ni internal electrode, and Ni of the internal electrode may be partially oxidized to form NiO, and MgO may be more easily soluble in NiO, compared to $BaTiO_3$. Therefore, a Ni—Mg—O secondary phase may be formed and agglomerated, and it may be difficult to distribute Mg in a grain boundary. Therefore, it may be difficult to increase grain boundary resistance, and it may be difficult to improve reliability.

According to an embodiment of the present disclosure, when electromotive force of the reducing atmosphere during the sintering is 50 mV or more higher than electromotive force of an Ni/NiO equilibrium partial pressure, an Ni internal electrode may not be oxidized thermodynamically. Therefore, formation of a Ni—Mg—O secondary phase may be suppressed and Mg may be uniformly dispersed in a grain boundary. Therefore, a ratio (C2/C1) of an Mg content (C2) of a grain boundary to an Mg content (C1) of a crystal grain may be controlled to be 3 or more, to improve grain boundary resistance and improve reliability.

When electromotive force of the reducing atmosphere during the sintering is 90 mV or less higher than electromotive force of the Ni/NiO equilibrium partial pressure, excessive oxygen vacancy may be formed to deteriorate reliability.

The electromotive force of the Ni/NiO equilibrium partial pressure may be an oxidation property of Ni, which may be a material-specific property, and may be measured by constructing a solid electrochemical cell using an oxygen ion conductive ceramic such as yttria-stabilized zirconia (YSZ).

In an embodiment, electromotive force of the reducing atmosphere during the re-oxidation may not be higher than electromotive force of the Ni/NiO equilibrium partial pressure, and not higher than 10 mV higher than electromotive force of the Ni/NiO equilibrium partial pressure. Since the re-oxidation process should maximally remove oxygen vacancy that may be generated in the sintering and may deteriorate reliability, it may be desirable to proceed in an atmosphere similar to the equilibrium partial pressure as much as possible. In this case, in order to fundamentally prevent Ni oxidation, the re-oxidation electromotive force should be maintained higher than a theoretical equilibrium electromotive force. Therefore, it may be desirable to perform re-oxidation at an electromotive force, slightly higher than the equilibrium point, within a range of 10 mV.

Next, a ceramic electronic component may be obtained by forming an external electrode on the body.

Experimental Example

A dielectric composition including barium titanate ($BaTiO_3$) as a main component and including 1 mole of MgO, 3.375 moles of $SiO_2$, and 0.8 moles of $Dy_2O_3$, relative to 100 moles of $BaTiO_3$, was prepared, and a conductive paste for internal electrodes including Ni was then applied to a ceramic green sheet including the dielectric composition, to form an internal electrode pattern. Then, a stack body obtained by stacking a plurality of ceramic green sheets on which the internal electrode pattern is formed was cut into chips, and the chips were sintered under conditions of a sintering atmosphere illustrated in Table 1 below. Then, re-oxidation heat treatment was performed to prepare a prototype multilayer ceramic capacitor (a proto-type MLCC).

An Mg content and a Dy content in a crystal grain and a grain boundary, included in a dielectric layer, were analyzed, and formation of a Ni—Mg—O secondary phase was observed, to illustrate results therefrom in Table 1 below. In addition, results of high-temperature acceleration life tests were illustrated in Table 1 below.

The Mg and Dy contents were measured using a scanning transmission electron microscope (STEM, FEI's Osiris model) equipped with an energy dispersive X-ray spectroscopy (EDS) under conditions of an acceleration voltage of 200 kV and a probe diameter of 1 nm.

First, a thin-layered specimen corresponding to a cross-section of a body cut in the length and thickness directions from a central portion in the width direction was prepared using a microsampling method.

Figure 8:
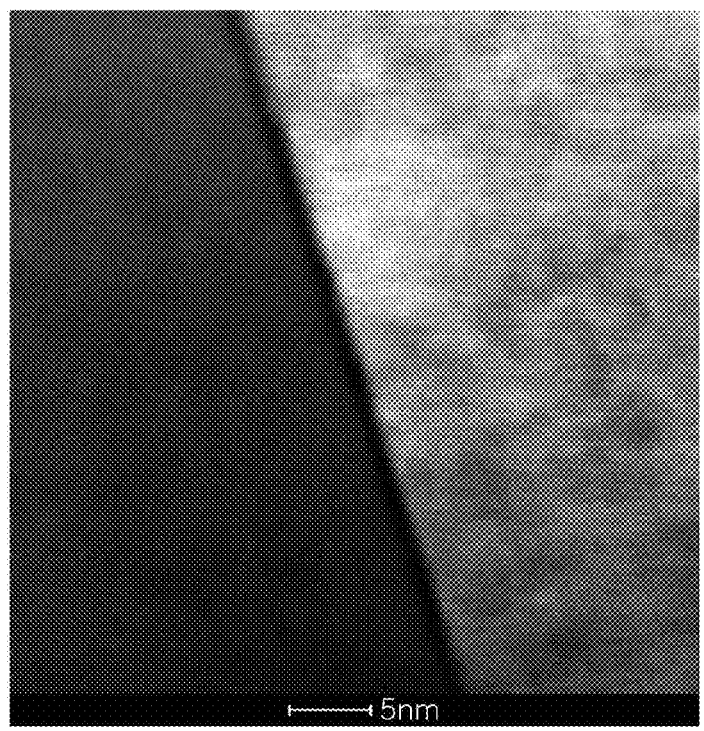
FIG. 8 is a STEM-HAADF image in which grain boundaries stand parallel to electron beams.

Composition of a grain boundary 111b was analyzed by observing the specimen by STEM to find grain boundaries parallel to an electron beam. Specifically, when a Fresnel fringe, which appears when defocused in an STEM-HAADF image, was observed symmetrically at both ends of the grain boundary as shown in FIG. 8, it was determined that grain boundaries were parallel to the electron beam.

Composition of a crystal grain 111a was analyzed at a position spaced 30 nm apart from a central portion of the grain boundary in a direction, perpendicular to the grain boundary.

In three dielectric layers arranged in a central portion of the body in the length and thickness directions, 10 random positions of grain boundary and grains were analyzed using STEM-EDS, and averaged values thereof were illustrated in Table 1 below.

Presence or absence of a secondary phase in Table 1 below were an analysis of the presence or absence of formation of an Ni—Mg—O secondary phase in a STEM-EDS mapping image observed in the range of 10 μm×10 μm, from a central portion of a cross-section of the body in the length and thickness direction, cut from a central portion in the width direction, as shown in FIGS. 6A to 7C.

In high-temperature acceleration life tests, 30 sample chips were prepared for each test number, and a voltage of 9.45V was applied at 105° C. for 12 hours, the sample chips of which insulation resistance is lower than ¹⁄₁₀ of an initial value were then determined as "bad," and the number of chips determined to be "bad" was described.

Mg was evenly distributed. Therefore, it may be confirmed that high-temperature acceleration life characteristics thereof were also good.

It can be seen that Test Nos. 2, 4 and 6 sintered in a sintering atmosphere less than 50 mV higher than electromotive force of an Ni/NiO equilibrium partial pressure had Mg (in grain boundary)/Mg (in crystal grain) of less than 3, Ni—Mg—O secondary phases were observed, and Mg was segregated. Therefore, it may be confirmed that high-temperature acceleration life characteristics thereof were also deteriorated.

Figure 6A:
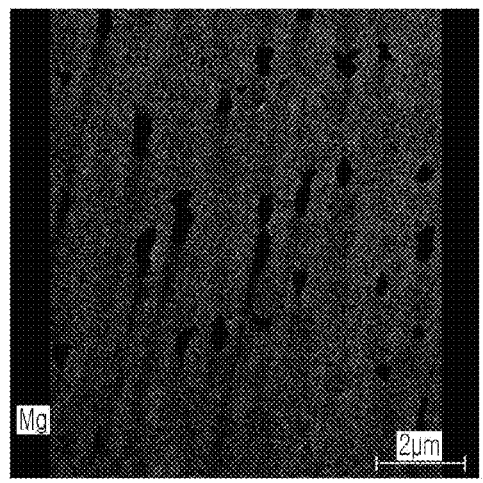
FIGS. 6A-6C are SEM-EDS mapping images taken at 9900× magnification of a central portion of a cross-section of Test No. 1 in length and thickness directions, cut from a central portion in a width direction.
Figure 6B:
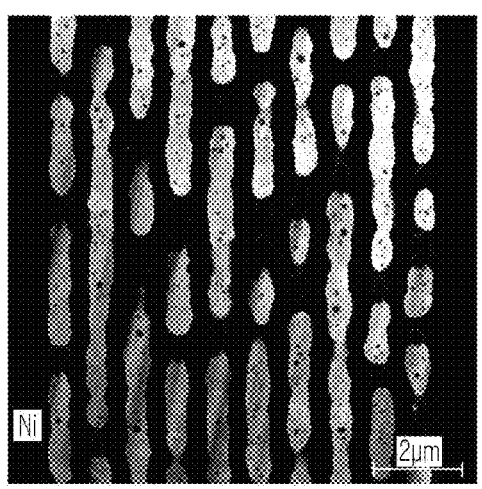
Figure 6C:
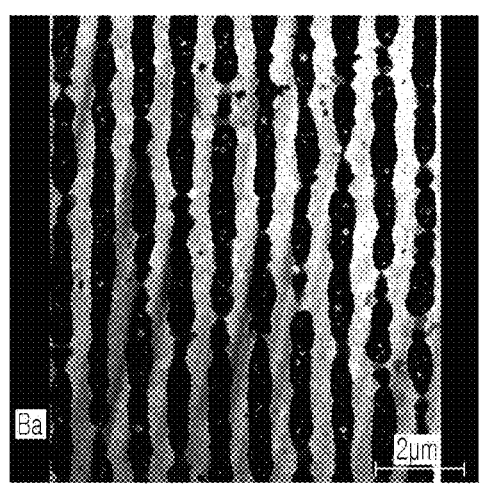
Figure 7A:
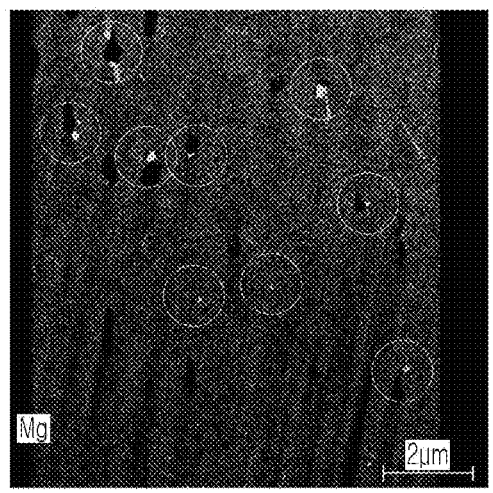
FIGS. 7A-7C are SEM-EDS mapping images taken at 9900× magnification of a central portion of a cross-section of Test No. 2 in length and thickness directions, cut from a central portion in a width direction.
Figure 7B:
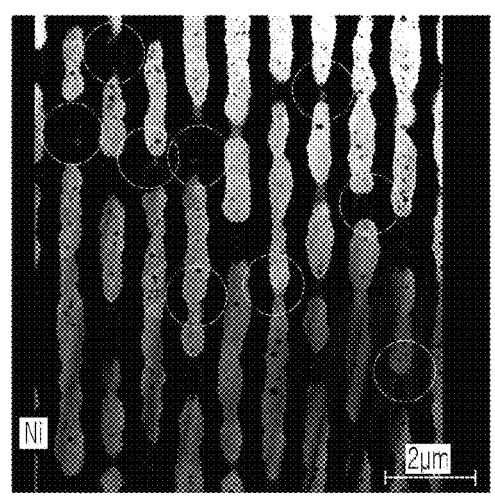
Figure 7C:
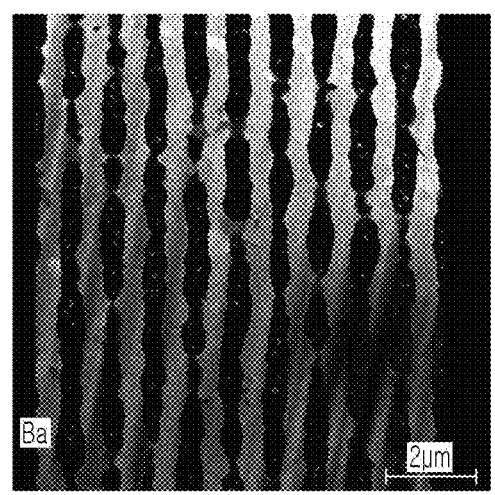

FIG. 6A-6C are STEM-EDS mapping images taken at 9900× magnification of a central portion of a cross-section of Test No. 1 in length and thickness directions, cut from a central portion in a width direction. FIG. 7A-7C are STEM-EDS mapping images taken at 9900× magnification of a central portion of a cross-section of Test No. 2 in length and thickness directions, cut from a central portion in a width direction. It can be confirmed that, in Test No. 1, no Ni—Mg—O secondary phase was observed, and, in Test No. 2, Ni—Mg—O secondary phases were observed in circled portions.

Figure 9:
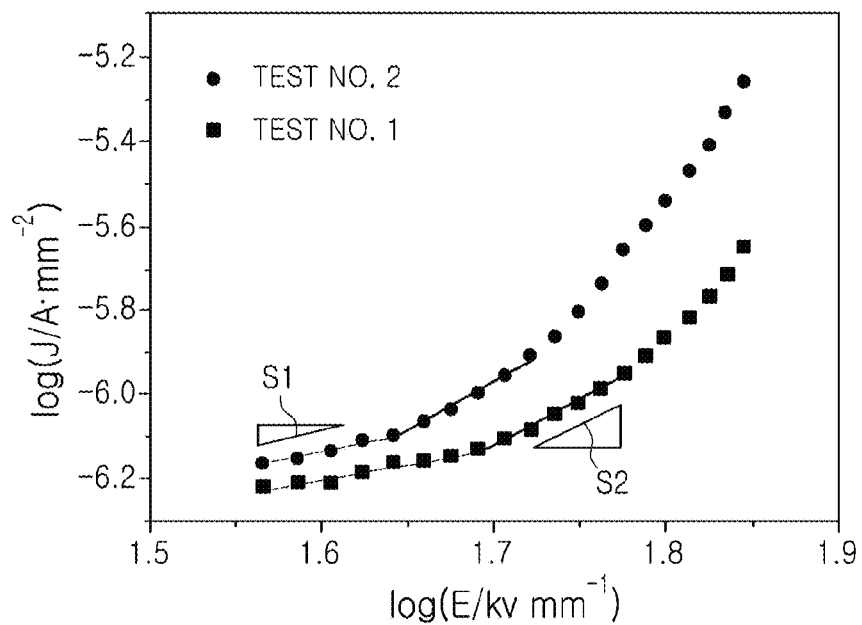
FIG. 9 is a graph (I-V curve) illustrating a change amount of leakage current according to an applied voltage for Test Nos. 1 and 2.

FIG. 9 is a graph (I-V curve) illustrating a change amount of leakage current according to an applied voltage for Test Nos. 1 and 2.

In order to accurately measure amounts of leakage current changing according to an applied voltage, a voltage was applied as a pulse form using a stairway measurement method. At a respective voltage, after applying a voltage (charging) for 5 seconds and discharging for 5 seconds, leakage current was measured. When a change in leakage current according to a voltage was represented by a double log graph (log I vs. log V), an Ohmic section in which no IR is deteriorated according to a slope (a section indicated by a dotted line with a slope S1), a section in which slow deterioration occurred due to deterioration of grain boundary resistance (a section indicated by a solid line having a slope S2), and a section in which fast deterioration occurred after grain boundary resistance was deteriorated may be distinguished. In this case, it may be determined that grain boundary resistance was strengthened, as the section in which slow deterioration occurred due to deterioration of grain boundary resistance appears to have a high voltage.

As illustrated in the analysis result of FIG. 9, it can be seen that the slow deterioration section of Test No. 1 occurred to have high electric field, and entry into the fast deterioration section was delayed, as compared to Test No. 2. Therefore, it may be confirmed that when Mg grain boundary distribution was induced by controlling a sintering atmosphere, grain boundary resistance may be enhanced.

Figure 10:
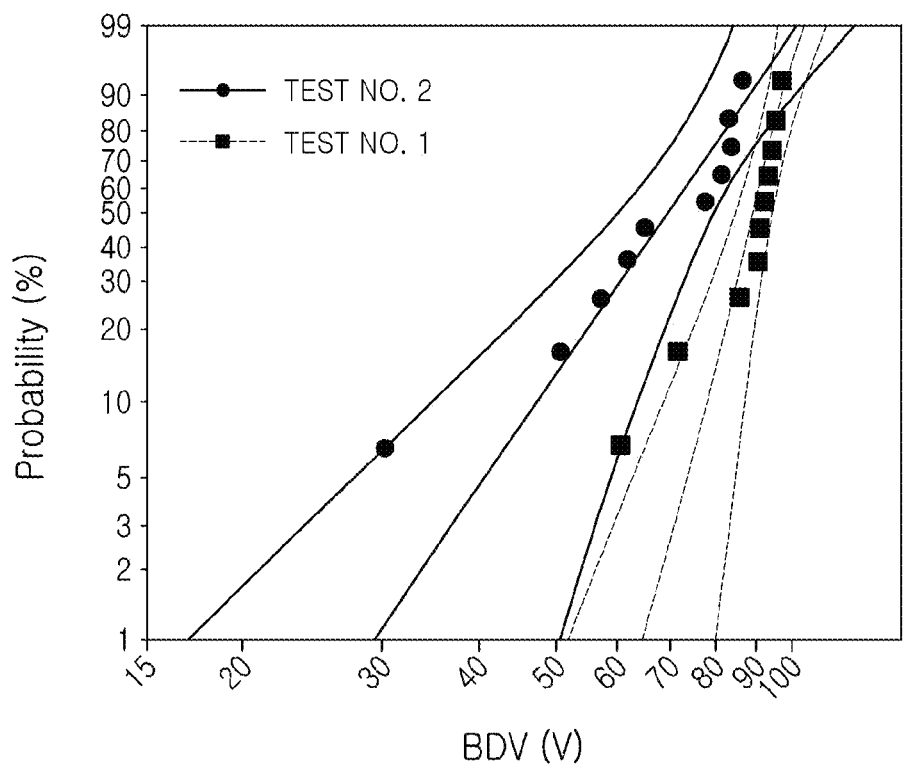
FIG. 10 is a graph illustrating Weibull distribution of BDV for Test Nos. 1 and 2.

FIG. 10 is a graph illustrating Weibull distribution of BDV for Test Nos. 1 and 2. It can be seen that average values

TABLE 1

| Test No. | Electromotive Force in Firing (mV) | Electromotive Force of Ni/NiO Equilibrium Partial Pressure (mV) | Difference in Electromotive Force | Dy (Grain) (at %) | Dy (Boundary) (at %) | Mg (Grain) (at %) | Mg (Boundary) (at %) | Mg (Boundary)/ Mg (Grain) | Secondary Phase | High Temp. Acceleration Life Span |
|---|---|---|---|---|---|---|---|---|---|---|
| 1 | 606 | 541 | 65 | 0.31 | 1.62 | 0.09 | 0.48 | 5.333 | X | 1/30 |
| 2* | 516 | 543 | −27 | 0.33 | 1.24 | 0.07 | 0.11 | 1.571 | ○ | 15/30 |
| 3 | 613 | 548 | 65 | 0.18 | 0.68 | 0.09 | 0.32 | 3.556 | X | 0/30 |
| 4* | 514 | 541 | −27 | 0.19 | 0.59 | 0.06 | 0.09 | 1.500 | ○ | 16/30 |
| 5 | 602 | 540 | 62 | 0.12 | 0.72 | 0.09 | 0.34 | 3.778 | X | 1/30 |
| 6* | 506 | 529 | −23 | 0.15 | 0.64 | 0.08 | 0.12 | 1.500 | ○ | 4/30 |

It can be seen that Test Nos. 1, 3, and 5 sintered in a sintering atmosphere of 50 mV or more higher than electromotive force of an Ni/NiO equilibrium partial pressure had Mg (in grain boundary)/Mg (in crystal grain) of 3 or more, no Ni—Mg—O secondary phase was observed, and of BDV were 68V for Test No. 2 and 88V for Test No. 1, and it may be confirmed that scale factors were also enhanced from 4.9 to 12.8, to improve dispersion thereof.

One of various effects of the present disclosure is to dispose Mg at a grain boundary of a dielectric to improve reliability.

However, various and advantageous advantages and effects of the present disclosure are not limited to the above description, and may be more readily understood in the process of describing the specific embodiments of the present disclosure.

While example embodiments have been shown and described above, it will be apparent to those skilled in the art that modifications and variations could be made without departing from the scope of the present disclosure as defined by the appended claims.

What is claimed is:

1. A ceramic electronic component comprising:
   a body including a dielectric layer and an internal electrode; and
   an external electrode disposed on the body and connected to the internal electrode,
   wherein the dielectric layer includes a plurality of crystal grains and a grain boundary disposed between adjacent crystal grains,
   wherein a ratio (C2/C1) of an Mg content (C2) of the grain boundary to an Mg content (C1) of at least one of the plurality of crystal grains is 3 or more.

2. The ceramic electronic component of claim 1, wherein the ratio (C2/C1) is 10 or less.

3. The ceramic electronic component of claim 1, wherein the Mg content (C2) of the grain boundary is an Mg content in a central portion of the grain boundary, and the Mg content (C1) of the at least one of the plurality of crystal grains is an Mg content at a position 30 nm apart from the central portion of the grain boundary in a direction, perpendicular to the grain boundary.

4. The ceramic electronic component of claim 1, wherein in a cross-section of the body, the dielectric layer and the internal electrode do not include an Ni—Mg—O-based secondary phase.

5. The ceramic electronic component of claim 1, wherein the Mg content (C2) of the grain boundary is 0.2 at % or more and 0.6 at % or less with respect to all contents of the grain boundary.

6. The ceramic electronic component of claim 1, wherein the Mg content (C1) of the at least one of the plurality of crystal grains is 0.01 at % or more and 0.15 at % or less with respect to all contents of the at least one of the plurality of crystal grains.

7. The ceramic electronic component of claim 1, wherein the at least one of the plurality of crystal grains has a core-shell structure having a core and a shell,
   wherein a ratio of the Mg content (C2) of the grain boundary to an Mg content of the shell is 3 or more.

8. The ceramic electronic component of claim 7, wherein an Mg content of the core is 0.01 at % or less with respect to all contents of the core.

9. The ceramic electronic component of claim 1, wherein the grain boundary further comprises Dy,
   wherein a Dy content is 0.5 at % or more and 2.0 at % or less with respect to all contents of the grain boundary.

10. The ceramic electronic component of claim 1, wherein the grain boundary further comprises Si,
    wherein an Si content is 1.0 at % or more and 5.0 at % or less with respect to all contents of the grain boundary.

11. A method for manufacturing a ceramic electronic component, comprising:
    forming a ceramic green sheet with a dielectric composition including Mg;
    applying a conductive paste for an internal electrode on the ceramic green sheet to form an internal electrode pattern;
    stacking a plurality of ceramic green sheets on which the internal electrode pattern is formed to obtain a stack body;
    sintering the stack body in a reducing atmosphere and re-oxidizing the sintered stack body in an oxidizing atmosphere, to prepare a body including a dielectric layer and an internal electrode; and
    forming an external electrode on the body,
    wherein electromotive force of the reducing atmosphere during the sintering is 50 mV or more higher than electromotive force of an Ni/NiO equilibrium partial pressure, and is 90 mV or less higher than the electromotive force of the Ni/NiO equilibrium partial pressure.

12. The method of claim 11, wherein electromotive force of the oxidizing atmosphere during the re-oxidation is greater than or equal to the electromotive force of the Ni/NiO equilibrium partial pressure and is 10 mV or less higher than the electromotive force of the Ni/NiO equilibrium partial pressure.

13. The method of claim 11, wherein the dielectric layer comprises a plurality of crystal grains and a grain boundary disposed between adjacent crystal grains,
    wherein a ratio (C2/C1) of an Mg content (C2) of the grain boundary to an Mg content (C1) of at least one of the plurality of crystal grains is 3 or more.

14. The method of claim 11, wherein the dielectric composition comprises $BaTiO_3$ as a main component, and comprises 0.2 to 3 moles of the Mg, relative to 100 moles of the $BaTiO_3$.

15. The method of claim 11, wherein the conductive paste for an internal electrode comprises Ni.

16. The method of claim 11, wherein the dielectric composition comprises 0.5 to 2 moles of Dy, relative to 100 moles of $BaTiO_3$.

17. The method of claim 11, wherein the dielectric composition comprises 1 to 5 moles of Si, relative to 100 moles of $BaTiO_3$.

18. A ceramic electronic component comprising:
    a body including a dielectric layer and an internal electrode; and
    an external electrode disposed on the body and connected to the internal electrode,
    wherein the dielectric layer includes a plurality of crystal grains and a grain boundary disposed between adjacent crystal grains,
    wherein a Mg content (C2) of the grain boundary is 0.2 at % or more and 0.6 at % or less with respect to all contents of the grain boundary.

19. The ceramic electronic component of claim 18, wherein the dielectric layer and the internal electrode do not include an Ni—Mg—O-based secondary phase.

20. The ceramic electronic component of claim 18, wherein the Mg content (C1) of at least one of the plurality of crystal grains is 0.01 at % or more and 0.15 at % or less with respect to all contents of the at least one of the plurality of crystal grains.

21. The ceramic electronic component of claim 18, wherein the grain boundary further comprises Dy, wherein a Dy content is 0.5 at % or more and 2.0 at % or less with respect to all contents of the grain boundary.

22. The ceramic electronic component of claim 18, wherein the grain boundary further comprises Si,
wherein an Si content is 1.0 at % or more and 5.0 at % or less with respect to all contents of the grain boundary.

23. A ceramic electronic component comprising:
a body including a dielectric layer and an internal electrode; and
an external electrode disposed on the body and connected to the internal electrode,
wherein the dielectric layer includes a plurality of crystal grains and a grain boundary disposed between adjacent crystal grains,
wherein in a cross-section of the body, the dielectric layer and the internal electrode are free of an Ni—Mg—O-based secondary phase.

24. The ceramic electronic component of claim 23, wherein a Mg content (C2) of the grain boundary is 0.2 at % or more with respect to all contents of the grain boundary.

25. The ceramic electronic component of claim 23, wherein a Mg content (C1) of at least one of the plurality of crystal grains is 0.01 at % or more and 0.15 at % or less with respect to all contents of the at least one of the plurality of crystal grains.

26. The ceramic electronic component of claim 23, wherein the grain boundary further comprises Dy,
wherein a Dy content is 0.5 at % or more and 2.0 at % or less with respect to all contents of the grain boundary.

27. The ceramic electronic component of claim 23, wherein the grain boundary further comprises Si,
wherein an Si content is 1.0 at % or more and 5.0 at % or less with respect to all contents of the grain boundary.

* * * * *